April 24, 1962 J. J. KERLEY, JR 3,031,163
PRESTRESSED CABLE ISOLATION SYSTEM
Filed April 1, 1959 4 Sheets-Sheet 1
FIG. I
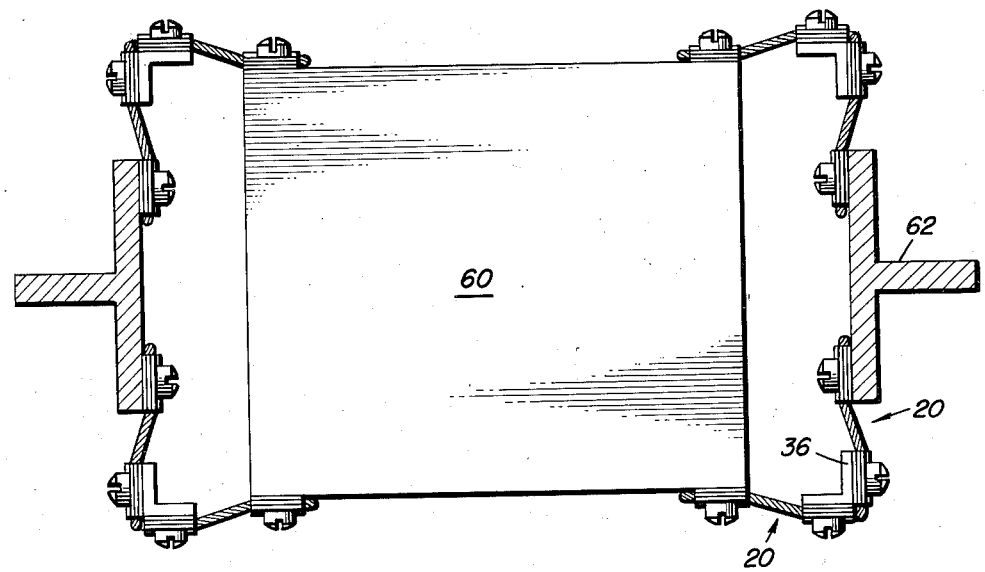
FIG. 2
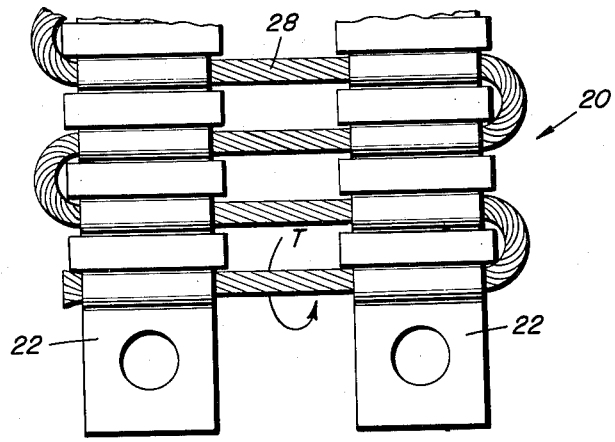
INVENTOR
James J. Kerley, Jr.
BY Walter G. Finch
ATTORNEY April 24, 1962 J. J. KERLEY, JR 3,031,163
PRESTRESSED CABLE ISOLATION SYSTEM
Filed April 1, 1959 4 Sheets-Sheet 2

INVENTOR
James J. Kerley, Jr.

BY Walter G. Finch
ATTORNEY

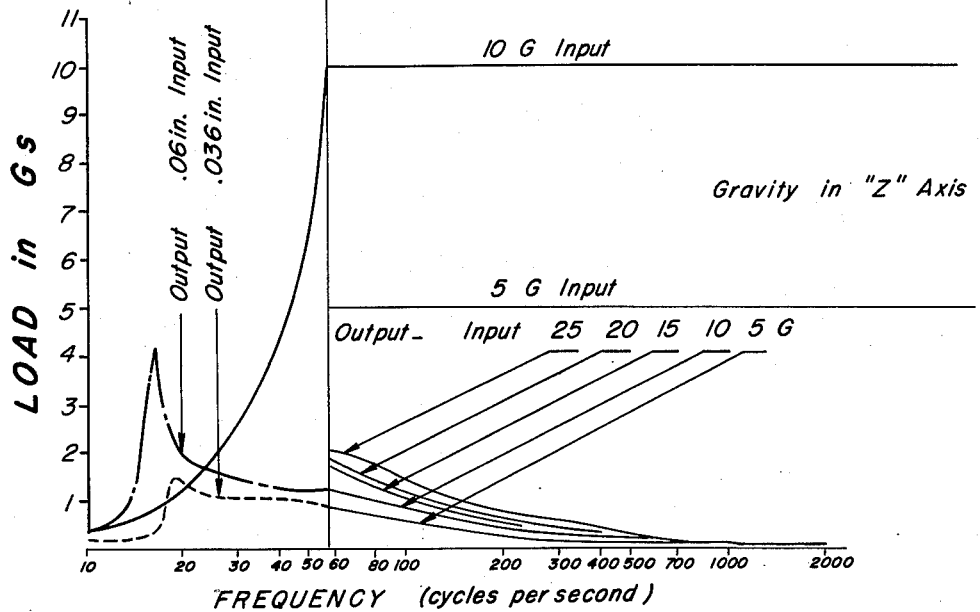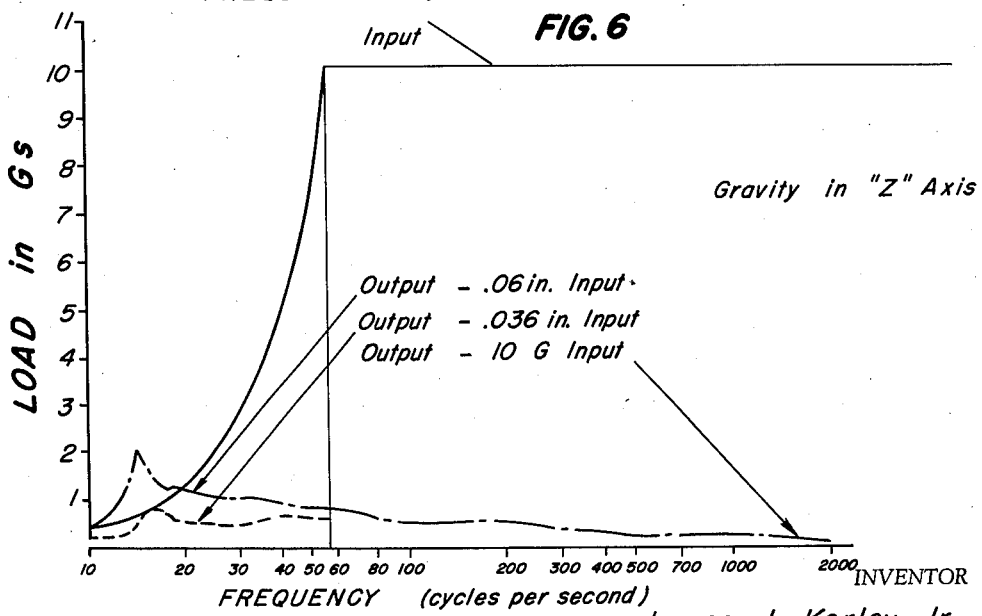

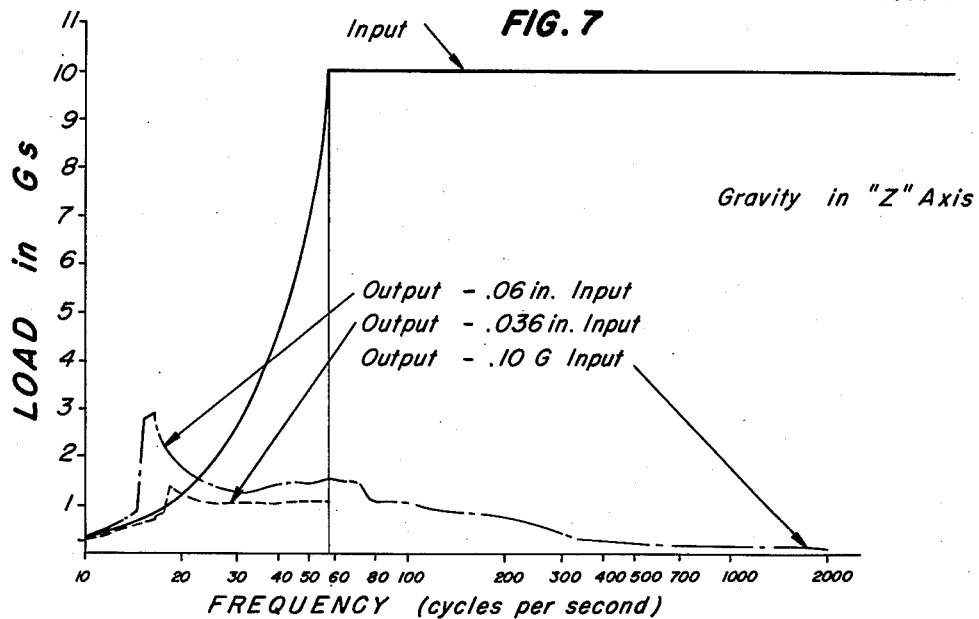
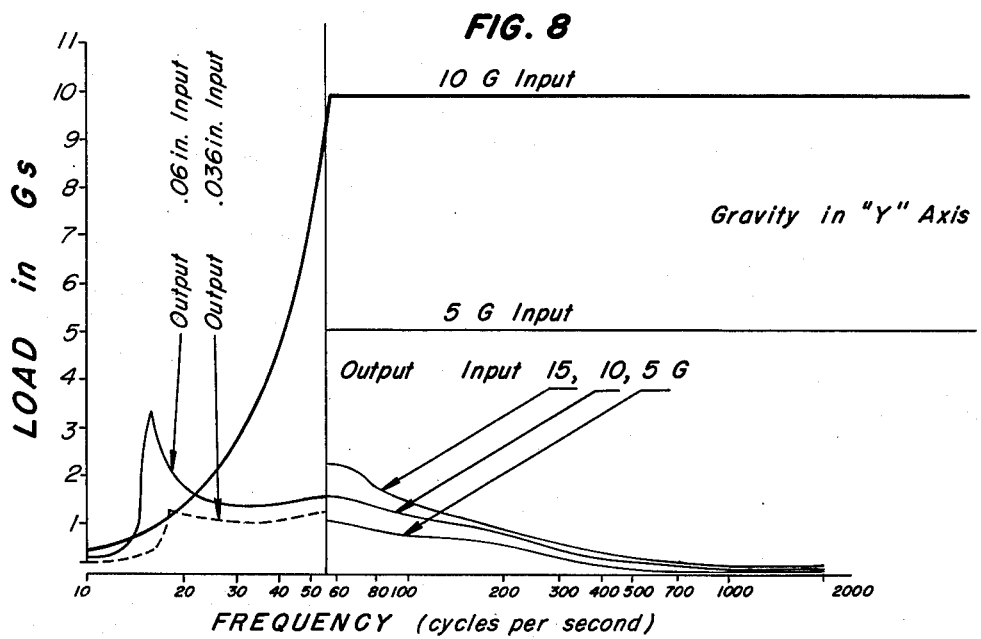

United States Patent Office 3,031,163
Patented Apr. 24, 1962

3,031,163
PRESTRESSED CABLE ISOLATION SYSTEM
James J. Kerley, Jr., Cheverly, Md., assignor to Kerley Engineering, Inc., Cheverly, Md., a corporation of Maryland
Filed Apr. 1, 1959, Ser. No. 803,512
11 Claims. (Cl. 248—358)

This invention relates generally to spring type supports, and more particularly it pertains to methods and arrangements for optimizing the performance of cable type vibration isolators.

Cable type shock and vibration isolators of various types have been described in a copending U.S. patent application of applicant's filed jointly with Raymond G. Hartenstein and Robert F. Cecce on June 26, 1958, Serial Number 744,787, for "Vibration Isolator Mount," and the present invention is an improvement on the cable isolator mounts disclosed therein.

Cable isolation systems are currently being used in subsonic and supersonic airplanes and missiles to isolate gyroscopes, electronic equipment, and the like. In addition, space platforms are being isolated. Cable isolation systems are most effective in isolating gyroscopes in modern missiles and aircraft because it is possible to design such systems so that the gyroscopes can have the same natural frequency in all three principal planes; because it is possible to isolate the gyroscope from shock and vibration in the presence of high steady state loads. In addition, such cable isolation systems can be designed to give the same natural frequency in all three planes regardless of the altitude of the gyroscope or space platform, and also because of the extremely low transmissibility of high frequency loads through cable isolation systems.

Attenuation of vibration for cable isolators is represented by a plot of frequency of vibration in cycles per second as abscissa versus load in gravity units as the ordinate. The curves obtained from such plots show a single principal response in any given plane, which is known as "resonance." The resonance vibration of a system can be shifted in frequency as desired by suitable choice of the lengths and diameters of the cables and their number. For any complex system, it is essential to isolate a structure in all three planes of motion, otherwise vibration forces will find their way into the isolated structure. These conditions are found, for example, where machinery is mounted on a vibrating medium.

It is an object of the present invention to provide techniques as well as arrangements for attenuating the principal or resonant frequency of vibration of a cable isolation system.

Another object of the invention is to provide a method and arrangment for reducing the amplitude of the residual or principal resonance of complex vibration system.

Still another object of this invention is to provide a shock and vibration mounting which is lighter and stronger than conventional shock and vibration arrangements.

Other objects of this invention are to provide shock and vibration prestressed cable isolation systems which are economical to manufacture, efficient and effective in operational use, and which are easy to install.

These and other objects and advantages of this invention will become more readily apparent and understood from the accompanying specifications and drawings in which:

FIG. 1 is a side elevation of a cable type vibration isolation system;

FIG. 2 is an enlarged side view of a portion of a cable vibration isolator of the cable type vibration isolation system shown in FIG. 1;

Figure 3:
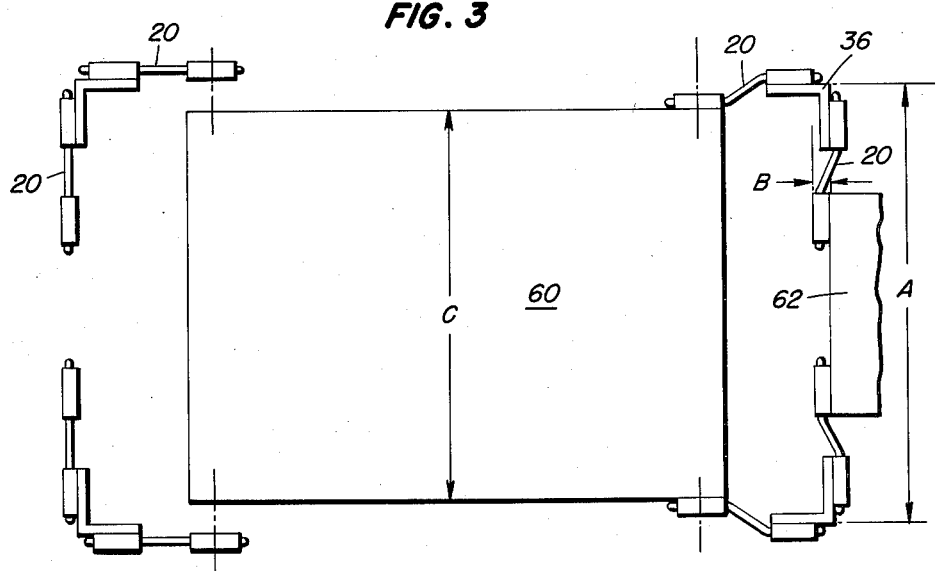
FIG. 3 is a diagrammatic side elevation of a prestressed cable type vibration isolation system showing its positions before and after prestressing thereof.

FIGS. 5, 6, and 7 are graphical plots of curves for the attenuation for a typical cable isolation system with the vibration being applied to the Z-axis, the X-axis, and the Y-axis, respectively; and FIG. 8 is a graphical plot similar to that of FIG. 7 but with gravity acting along the Y-axis instead of the Z-axis.

Referring now to FIG. 1 of the drawings, there is illustrated generally an isolated mass 60, such as a gyroscope or some other delicate instrument, such as electronic equipment, space platforms, or the like, suspended from a support 62 by a plurality of vibration isolators 20. Vibration isolators 20 are preferably arranged in series of two at approximately right angles to each other. A structural angle 36 is used to join the vibration isolators 20 in pairs. Other forms of cable isolators as described in the referenced copending patent application mentioned above may be used to fit the design conditions.

Each vibration isolator 20, in the preferred form, is made of a pair of spaced combstrips 22 having a multistrand resilient cable 28 reeved therethrough by successive passes thereof, as shown best in FIG. 2. These combstrips 22 can be formed by milling, broaching, or extrusion thereof so as to have a series of alternating grooves and ridges therein. The multi-strand resilient cable 28 is passed back and forth between the grooves and ridges in the combstrips 22, and they are held together by crimping or otherwise.

A prestressing or loading force is applied to the cable 28 and mass 60 by suitable dimensions to bend the cables 28 so that initial tension is introduced therein when the vibration isolators 20 are assembled to the mass 60 and support 62. This deformation of the cable 28 is illustrated in FIG. 1 and suggested dimensioning arrangements are shown in FIGS. 3 and 4.

Depending on the configuration and amount of space available, the prestress of the cable 28 may be applied toward or away from the central isolated mass 60 or in combination therewith. In FIG. 3, a deformation of dimension B for prestress of the vibration isolators 20 is produced by relative close spacing of the support 62 to the mass 60. By making dimension A larger than dimension C of the mass 60, the associated vibration isolators 20 of the pair are stressed inwardly. On the left of FIG. 3, the relaxed, unattached vibration isolators 20 are shown for the cable vibration isolation system.

Figure 4:
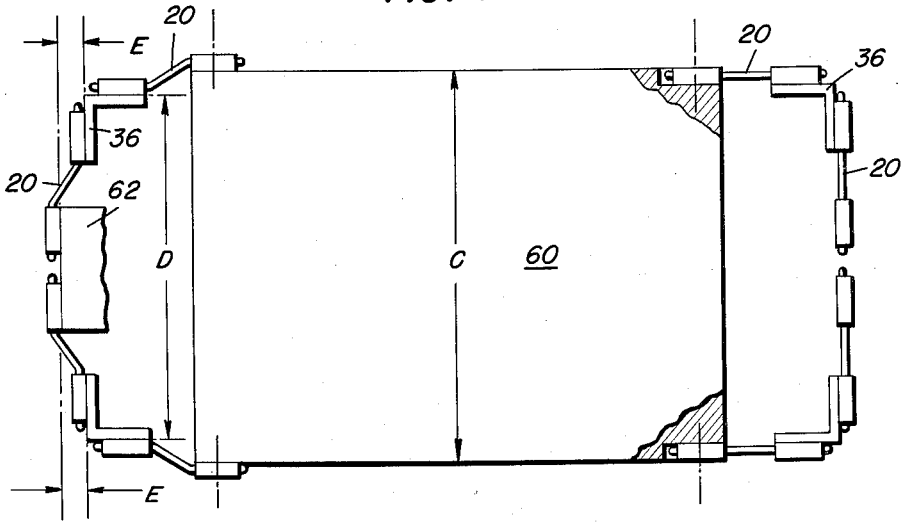
FIG. 4 is a diagrammatic side elevation of another prestressed cable type vibration isolation system showing its positions before and after prestressing thereof.

In FIG. 4 there is illustrated at the left thereof how space may be conserved by an alternate stressing arrangement of the cable vibration isolation system. The right side of FIG. 4 shows the unstressed, relaxed condition of the cable vibration isolation system. The dimension D is made smaller than dimension C of the mass 60 to stress the top and bottom vibration isolators 20 and the support 62, with suitable dimensioning to force the end vibration isolators 20 to deform outwardly.

Other cable prestressing arrangements may be obtained by twisting the stranded resilient cable 28 as shown at T in FIG. 2. The more compacted the strands of the cable 28 become the greater their internal friction, and the prestress deformations of the cables 28 desirably introduce damping to the resonant peaks. These resonant peaks of vibration of the system diminish to a minimum at all attitudes of load and directions of vibration when shifted to a common frequency for the three planes in the manner related in the introduction to this specification.

Such prestressing of the cable 28 can be done while the cable is being wound in manufacture thereof, or while the cable vibration isolation system is being assembled. Prestressing of the cable 28 cuts down on the excursions thereof, and, at the same time, it increases the fatigue life thereof. In view of the fact that no two cables 28 can be prestressed precisely the same, the resonant buildup in the cable vibration isolation system is minimized.

FIGS. 5, 6, 7, and 8 illustrate diagrammatic plots of curves, the data for which was taken from actual shock and vibration tests made on the cable vibration isolation system shown in FIG. 1.

As illustrated in FIGS. 5, 6, 7, and 8, it is to be observed that high-frequency vibrations do not get through to the internal structure. Above 500 cycles per second attenuations are .01. Above 100 cycles per second, common attenuations are .05. This attenuation is present in all three planes. When random noise is applied to the cable vibration isolation system, the only response is felt at the resonant frequency of the system and below. Thus, electronic equipment has been isolated in helicopters where a random-noise type of excitation is predominant.

It is to be noted that prestressing of the individual cables 28 for each vibration isolator 20 as well as the entire vibration isolator system formed of the vibration isolators 20 effectively controls the motion of the system to bring down the magnification at resonance of the system and still allow ample isolation thereof from vibration at the higher frequencies. It should also be noted that prestress of an isolated mass 60 as described above has the added feature of adding substantial rigidity to the outside structure which support 62 is secured and it can thus be made lighter.

For example, shipping containers can be made lighter if the internal medium has rigidity. The inside of a missile can be used to give rigidity to the container. The gyroscope can be used to give rigidity to the outside container. Thus, rigidity of the system can be achieved while the shock and vibration features of the system are retained.

It is also to be noted that prestressing of the cable vibration isolation system and cables 28 does not change the characteristics of the isolation system. This principle can be further projected to include steady-state loads on top of vibration. The response of the system to inputs without steady-state loads and system loads up to 15 G shows that the natural frequency rises from 20 to 25 cycles per second when the prestress is applied. The response to high-frequency vibration is changed slightly.

There is a limit to how much prestress of the cable vibration isolation system can be applied but actual field tests have gone as far as 50 G preload with ample isolation on the cable vibration isolation systems.

In one cable vibration isolation system incorporating the features of this invention which was field tested on a supersonic sled of 22 G steady-state loads superimposed on vibration loads up to 20 G, the system performed satisfactorily in all three planes without any deterioration in the output signal of the electronic package.

Obviously many other modifications and variations of the present invention are possible in light of the above teachings. It is, therefore, to be understood that within the scope of the appended claims the invention may be practiced otherwise than as specifically described.

What is claimed is:

1. In combination, a mass, and a cable isolation system consisting of vibration isolator mounts having prestressed cable elements laterally tensioned to prevent excursion thereof, said cable elements being mechanically connected to said mass for isolating said mass from shock and vibration in its three principal directions and each mount comprising means engaging each cable element thereof at each end and positioning the engaged cable portions in offset substantially parallel alignment.

2. In combination, a mass and a cable isolation system mechanically connected to said mass for isolating said mass from shock and vibration in its three principal directions, said system including at least two pairs of identical vibration isolator mounts each having prestressed cable elements and each mount comprising means engaging each cable element thereof at each end and positioning the engaged cable portions in offset substantially parallel alignment, the cable elements being laterally tensioned to prevent excursions thereof, each pair of identical cable vibration isolator mounts being located on opposite sides of said mass, with one end of each cable vibration isolator mount of each pair of isolator mounts being connected to a support and the other corresponding end thereof being connected to said mass to be isolated from shock and vibration.

3. An arrangement as recited in claim 2, wherein each said vibration isolator mount consists of two cable type vibration isolators arranged in series of two at substantially right angles to each other.

4. An arrangement as recited in claim 3, wherein each said vibration isolator consists of a pair of parallel spaced combstrips having a multi-strand resilient cable reeved back and forth therethrough by successive passes of said cable.

5. An arrangement as recited in claim 2, wherein said prestressed cable elements consist of multi-strand cable which has been prestressed prior to being assembled in each said vibration isolation mount.

6. In combination, a mass, and a cable isolation system mechanically connected to said mass for isolating said mass from shock and vibration in three principal directions, said system including a plurality of vibration isolation mounts, each said mount consisting of a pair of identical cable type vibration isolators having prestressed cable elements laterally tensioned to prevent excursions thereof, said cable elements being mounted at substantially right angles to each other and having their adjacent ends connected together and their opposite ends connected to said mass and to adjacent support structure so as to isolate said mass from vibrations and shock from said adjacent support structure and each isolator comprising means engaging the cable elements thereof at each end and positioning the engaged cable portions in offset substantially parallel alignment.

7. An arrangement as recited in claim 6, wherein cable type vibration isolator consists of a pair of parallel spaced elements having a multi-strand resilient cable reeved back and forth through said elements by successive passes of said cable.

8. An arrangement as recited in claim 6, wherein two pairs of vibration isolation mounts are positioned on opposite sides of said mass to be isolated from shock and vibration.

9. An arrangement as recited in claim 6, wherein said cable elements are prestressed prior to assembly in each said vibration isolator by twisting of said cable elements.

10. An arrangement as recited in claim 6, wherein said cable elements are prestressed subsequent to assembly in each said vibration isolator by deflecting the cable elements of each vibration isolator at an angle to said mass, other than being parallel or at right angles thereto, with said support structure being moved inwardly toward said mass from its normal position where the vibration isolators of each mount are arranged at right angles to each other.

11. An arrangement as recited in claim 6, wherein said cable elements are prestressed subsequent to assembly in each said vibration isolator by deflecting the cable elements of each vibration isolator at an angle to said mass other than being parallel or at right angles thereto, with said support structure being moved outwardly from said mass from its normal position where the vibration isolators of each mount are arranged at right angles to each other.

References Cited in the file of this patent
UNITED STATES PATENTS
2,493,788    Turlay _____ Jan. 10, 1950